United States Patent Office 2,840,450
Patented June 24, 1958

2,840,450

PROCESS FOR SEPARATING AND RECOVERING CARBON DIOXIDE FROM GASEOUS MIXTURES

Giuseppe Giammarco, Porto Marghera, Italy, assignor to S. p. A. "Vetrocoke," Turin, Italy No Drawing. Application December 6, 1955
Serial No. 551,196

Claims priority, application Italy December 6, 1954

4 Claims. (Cl. 23—2)

It is known that absorption of carbon dioxide from gaseous mixture containing it is effected by means of various absorbing solutions, among which the best known ones are solutions of alkaline salts, such as sodium, potassium and ammonio carbonates, phosphates, borates, mono and polyvalent phenolates and solutions of aminoalcohols.

Various suggestions for improvement have been made in industry, more particularly in respect of the low absorption rate which distinguishes the above-mentioned absorbing liquids, hence the size of the plant, as well as in respect of the heat consumption for operating the decarbonating cycle which, as is well known, comprises an absorption and a regeneration step.

For instance, it is known that a number of research engineers had tested the influence of the addition to the solutions of mineral alkaline salts of various substances, such as glycol, glycerine, glucose, dextrose, phosphates, amides etc. with results of hardly any industrial importance.

It is further known that alkaline solutions have recently been successfully activated, that is their usefulness has been improved by adding substances of the class of protides and aminoacids.

Applicant ascertained as a result of extensive research work both by way of laboratory tests and in the industrial field that the addition of selenious acid or tellurous acid or compounds derived therefrom exerts on solutions of alkaline substances a high activating effect which makes them particularly suitable for industrial use.

This activating effect was ascertained both with solutions of alkaline salts, such as sodium, potassium and ammonium carbonates, phosphates, borates, mono- and poly-valent phenolates, and solutions of aminoalcohols, such as ethanolamines and the like.

This invention provides a process for absorbing at atmospheric pressure or superatmospheric pressure carbon dioxide from gaseous mixtures containing it by means of alkaline solutions which have been admixed with selenious or tellurous acid or compounds derived therefrom.

Applicant ascertained that the activating power of the selenious or tellurous acid, or compounds thereof, is very effective already with very small additions to the absorbing solutions (5 to 10 g./l.), further additions being gradually less effective.

With aminoalcohol solutions the activating efficiency of the addition of salts of the selenious or tellurous acid is demonstrated by the following results obtained in the same experimental plant in which carbon dioxide absorption has been specially carried out incompletely in order to set out the effectiveness of the addition of the salts of the selenious or tellurous acid.

In the said experimental plant, comprising an absorption and a regeneration apparatus operating in the hot in the known manner, by washing at room pressure at 40° C. a gas containing 10% carbon dioxide by means of a 20% aqueous solution of triethanolamine, with gas to liquid ratio of 35 to 1, the carbon dioxide content in the washed gas was 2%.

By washing under the same conditions the same gas by the same solution which had been admixed with 15 g./l. potassium tellurite, the $CO_2$ content in the washed gas sank to 0.8%.

The above specified activants are advantageously unaffected by the action of oxygen. This permits inter alia when using alkaline solutions free from volatile compounds of the type referred to above to effect regeneration with oxygen containing gas, even air, as described in Italian Patents No. 470,758, dated August 5, 1950, and No. 518,145, dated March 4, 1955.

It was finally ascertained in experiments carried out by applicant both by way of laboratory tests and in industrial plants, that absorbing solutions activated by additions in variable quantities of selenious or tellurous acid or compounds thereof, can in turn be increased in effectiveness by adding thereto further substances having a synergic action in respect of selenious or tellurous acid or their compounds. Such substances are zinc, trivalent arsenic, aluminum and beryllium salts and compounds, aminoacids and further substances of a similar amphoteric behaviour, and boric acid. The use of aminoacids is more particularly convenient from an industrial standpoint, especially considering their high effectiveness. The synergic action is such that the total activating action exceeds the mere sum of the individual actions of the respective substances.

The synergic action of the above mentioned substances occurs even with slight additions, consistent with the solubility of the said substances in the alkaline solutions activated by selenious or tellurous acid or compounds thereof.

Applicant further ascertained in the course of experiments that alkaline selenites and tellurites are soluble in polyvalent alcohols, such as glycol, glycerine and the like. Such salts are therefore added to glycol solutions or glycol and ethanolamine solutions for absorbing carbon dioxide even at temperatures below 0° C., whereby a very thorough purification from carbon dioxide can be obtained, as required for operation of the fractionating apparatus for fractionating gaseous mixtures at very low temperatures.

Applicant moreover employs the said solutions of alkaline selenites or tellurites in polyvalent alcohols of the abovementioned type for removing carbon dioxide and simultaneously dehydrating the gaseous mixtures.

The above will be illustrated by the following examples.

*Example 1*

A conversion gas containing 28% $CO_2$ compressed to 12 at. is washed in a tower sprinkled with a potassium carbonate solution containing 200 g./l. $K_2O$ and 10 g./l, potassium tellurite at a temperature of 95° C. The gas leaves the tower with a residual $CO_2$ content of 0.2–0.4%. Under these conditions, 1 cubic meter of the said solution absorbs up to 25 cubic meters $CO_2$. Regeneration is effected in the hot by any known process.

The same results are obtained by similar solutions which have been admixed with potassium selenite in a quantity equivalent to tellurite.

*Example 2*

A gas containing 10% $CO_2$ washed at room pressure by means of sodium carbonate solution containing 50 g./l. $Na_2O$ and 15 g./l. sodium selenite, with a 1/35 liquid/gas ratio at a temperature of 85° C. issues with a residual $CO_2$ content of 0.3%. The same results are obtained in a similar manner by replacing the selenite by a corresponding tellurite quantity.

Regeneration is effected in the hot by any known process.

What I claim is:

1. In a method of removing carbon dioxide from a gaseous mixture containing it which comprises the steps of bringing said gaseous mixture into contact with an aqueous solution of an alkaline absorbent for said carbon dioxide selected from the group consisting of aliphatic amino alcohols and carbonates, phosphates, borates, monovalent phenolates and polyvalent phenolates of a member of the group consisting of sodium, potassium and ammonium to effect absorption of said carbon dioxide, and regenerating said aqueous solution after contact with said gaseous mixture by heating to expel absorbed carbon dioxide, the further step which comprises incorporating in said first-named solution before contact with said gaseous mixture, an absorption activating agent selected from the group consisting of selenious acid, tellurous acid and their alkali metal salts.

2. In the process of removing carbon dioxide from a gaseous mixture containing it by bringing said gaseous mixture into contact with an aqueous alkaline absorption solution effective to react with said carbon dioxide to effect absorption of said carbon dioxide, and regenerating said aqueous solution after contact with said gaseous mixture by heating to expel absorbed carbon dioxide, the step which comprises incorporating in said first-named solution before contact with said gaseous mixture, an absorption activating agent selected from the group consisting of selenious acid, tellurous acid and their alkali metal salts.

3. In a method of removing carbon dioxide from a gaseous mixture containing it which comprises the steps of bringing said gaseous mixture into contact with an aqueous solution of an alkaline metal phenolate to effect absorption of said carbon dioxide, and regenerating said aqueous solution after contact with said gaseous mixture by heating to expel absorbed carbon dioxide, the further step which comprises incorporating in said first-named solution before contact with said gaseous mixture, an absorption activating agent selected from the group consisting of selenious acid, tellurous acid and their alkali metal salts.

4. A method of removing carbon dioxide from a gaseous mixture containing it which comprises the steps of bringing said gaseous mixture into contact with an aqueous solution of an alkaline absorbent for said carbon dioxide selected from the group consisting of aliphatic amino alcohols and carbonates, phosphates, borates, monovalent phenolates and polyvalent phenolates of a member of the group consisting of sodium, potassium and ammonium to effect absorption of said carbon dioxide, and regenerating said aqueous solution after contact with said gaseous mixture by heating to expel absorbed carbon dioxide, said first-named solution having incorporated therein before contact with said gaseous mixture an absorption activating agent selected from the group consisting of selenious acid, tellurous acid and their alkali metal salts.

References Cited in the file of this patent

UNITED STATES PATENTS

| | | |
|---|---|---|
| 1,549,426 | Weiss | Aug. 11, 1925 |
| 1,964,808 | Bottoms | July 3, 1934 |
| 2,177,068 | Hutchinson | Oct. 24, 1939 |